United States Patent [19]
Zaborszki

[11] Patent Number: 5,109,970
[45] Date of Patent: May 5, 1992

[54] AGGREGATE PARTICLE SHIELD

[75] Inventor: Tony Zaborszki, Kings Mountain, N.C.

[73] Assignee: W.S. Tyler, Inc., Gastonia, N.C.

[21] Appl. No.: 731,806

[22] Filed: Jul. 17, 1991

[51] Int. Cl.⁵ .............................................. B65G 11/16
[52] U.S. Cl. ..................... 193/2 R; 193/32; 193/25 R; 198/956
[58] Field of Search ................. 198/534, 956; 193/2 R–25 R, 25 E, 25 A, 32

[56] References Cited

U.S. PATENT DOCUMENTS

| | | | |
|---|---|---|---|
| 4,478,300 | 10/1984 | Mikami | 193/2 R X |
| 4,547,985 | 10/1985 | Silins et al. | 193/2 R X |
| 4,693,355 | 9/1987 | Bochi et al. | 198/956 X |
| 5,055,336 | 10/1991 | Davis | 193/2 R X |

FOREIGN PATENT DOCUMENTS 1460333  2/1989  U.S.S.R. ................. 198/534
1490064  6/1989  U.S.S.R. ................. 198/534

OTHER PUBLICATIONS

W. S. Tyler, Inc. *Tyler Presents Ceramathane Ceramic/Polyurethane Wear Liners* no date available.

Primary Examiner—D. Glenn Dayoan
Attorney, Agent, or Firm—Shefte, Pinckney & Sawyer

[57] ABSTRACT

An aggregate particle shield for use as a wearliner or the like, in aggregate material transport devices such as line vibrating feeders, discharge chutes, or the like having a multiplicity of ceramic plugs upstanding in a polyurethane bed and arranged in a predetermined pattern. The ceramic plugs are interconnected, with every plug in each row of the predetermined pattern linked by a connecting wire, and present their upper surfaces for impact with the aggregate particles. The impact plugs may be formed in various shapes to resist becoming dislodged from the polyurethane bed.

19 Claims, 4 Drawing Sheets

AGGREGATE PARTICLE SHIELD

BACKGROUND OF THE INVENTION

The present invention relates broadly to aggregate particle shields, known as wearliners, for aggregate material transport devices such as line vibratory feeders, discharge chutes, feeder hoppers, and the like, and more particularly to an aggregate particle shield having an array of ceramic cylinders upstanding in a molded bed, presenting a surface for impact by aggregate particles. Wearliners are known generally throughout the ore production industry as well as that segment of the power generation industry utilizing coal-fired power plants. Ore in its aggregate form must be transported from the mine to the power plant (or wherever it is used) and much of the transport is along conveyors, down chutes, through hoppers, and along vibrating feeders. Also, ore is often sifted to remove contaminants using a vibratory screen.

The ore particles themselves are highly abrasive, being formed of an extremely hard material and appearing in highly irregular shapes. As such, the areas surrounding transport devices tend to take a heavy beating from the loose ore set into motion by the transport device itself.

To protect the equipment involved, an aggregate particle shield is utilized. Positioned on surfaces which receive aggregate particle input, a typical aggregate particle shield must present a highly abrasive resistant surface for impact with the aggregate ore (or whatever abrasive aggregate substance is involved) in a manner light and flexible enough to adapt to various locations and applications.

One current aggregate particle shield utilizes rows of ceramic plugs upstanding in a bed of hardened polyurethane with only the upper surface of the plug initially exposed for impact. Aggregate particle shields are generally relatively thin in relation to their length and width dimensions in order to take up as little space as possible along the transport device or within the vibratory feeder box while still presenting a large area for impact. As such, the impact force must be absorbed by a small wear-resistant body, the impact plug. Accordingly, it is desirable to maximize the surface area of ceramic material exposed to impact.

The impact plugs are arranged in regular rows and columns and are held in place by the polyurethane. The plugs themselves are formed of a highly wear resistant ceramic material and each has a large hole bored through the plug body. During molding, this hole fills with polyurethane, and when filled, helps to anchor the ceramic plugs in place within the polyurethane bed. Since the plugs are arranged in a strict row and column arrangement, smaller diameter plugs of a like material are used to fill part of the space between the plugs.

One significant problem encountered with current aggregate particle shields occurs when plugs loosen within the polyurethane after repeated impact. While the ceramic plugs themselves can generally absorb such repeated impact for years, they may become dislodged from the polyurethane and eventually fall out of the shield. Further, the large diameter hole required to be drilled through the plug body, although filled with polyurethane when in use, weakens the structural integrity of the plug resulting in more frequent plug fracture. Another problem which arises is chipping along the edges of the plug due to the sharp edge between the upper flat impact surface and the annular side wall of the plug body. Impact forces along this sharp edge are absorbed by a very small surface area which can cause chipping. Further, the smaller plugs that are used to fill the space between the rows and columns of larger plugs fracture and chip much more easily than the larger plugs due to their small size.

It is accordingly an object of the present invention to provide an aggregate particle shield utilizing only one size of plug which is less resistant to fracture, maximizes the ceramic impact surface presented for aggregate particle impact, and in which the plugs are more firmly held in place.

SUMMARY OF THE INVENTION

Briefly described, the present invention provides an aggregate particle shield for use as a wearliner or the like, in aggregate material transport devices, such as line vibrating feeders, discharge chutes, feeder hoppers, or the like. The particle shield of the present invention basically includes a multiplicity of impact plugs formed of a material highly resistant to wear caused by aggregate particle impact. The plugs have a body including an upper surface and are arranged in a predetermined pattern and oriented so that all of the upper surfaces thereof are substantially co-planar. A filler formed of a hardened, molded material for occupying the interstices between the impact plugs and areas surrounding the impact plugs is also included, thereby giving shape and resiliency to the shield while retaining the impact plugs in position and presenting the impact plugs for contact with the aggregate particles. Also included within the invention is a connecting member formed of a strong resilient material for interconnecting at least some of the impact plugs in the predetermined pattern to maintain the impact plugs in the predetermined pattern and to assist in holding the impact plugs in position during and after repeated aggregate particle impact, thereby enhancing the strength and stability of the shield.

In the preferred embodiment of the present invention, the aggregate particle shield includes plugs that are formed of a ceramic material which is composed of 99.5% pure alumina and 0.5% silica. The filler material is formed of polyurethane and the connecting member is a metal wire. Preferably, the shield includes a backing plate made of steel and located behind the predetermined pattern of impact plugs in the polyurethane bed, providing structural strength and rigidity to the shield.

Preferably, each plug body includes a passageway formed therethrough and the connecting member is inserted through the passageways of a plurality of the impact plugs, thereby interconnecting and aligning the plurality of impact plugs within the predetermined pattern. It is further preferred that each impact plug include a lower surface spaced away from the upper surface with the passageway located closely adjacent the lower surface, thereby locating the passageway away from the impact area, and thus reducing the likelihood of impact plug fracture resulting from the effect of repeated aggregate article impact.

In the preferred embodiment of the present invention, the impact plugs are generally cylindrical and the predetermined pattern arrangement includes a plurality of rows, each having the impact plugs disposed in a side-by-side relationship with the passageways in the impact plugs aligned and with the connecting member passing through the aligned passageways so that each plug in each row is connected to every other plug in that row. It is further preferred that the predetermined pattern include each row being disposed in spaced parallel relation to an adjacent row so that imaginary lines connecting the centers of any two plugs in a row and the center of the plug in an adjacent row which is closest to the two plugs form an equilateral triangle, thereby equalizing the space between all plugs within the shield and maximizing the impact plug surface area presented by said shield, and eliminating the previously-mentioned use of smaller diameter plugs from the shield. Preferably, the impact plugs are formed in a generally cylindrical shape and include at least one side wall, and they are formed with a rounded exterior surface at the location where the side wall intersects the upper surface which aids wear resistance by reducing the chipping at the edges of the impact plug caused by impact with the aggregate particles. The rounded edge distributes any impact force over a much larger area than that presented by a sharp edge, thereby reducing the likelihood of chipping.

In another embodiment of the present invention, the impact plugs include at least one side wall and are formed in one of a plurality of distinct shapes being generally cylindrical and having a reduced traverse cross-sectional area which creates an annular cavity in the side wall of the impact plug for receiving the filler material thus providing an increased purchase on the impact plugs by the filler material whereby the impact plugs are held securely in place. It is further preferred that one of the plurality of distinct shapes of the impact plugs includes a side wall that is a concave surface of revolution about the center axis of the impact plug. In other embodiments of the present invention, the impact plugs include an annular channel formed in the side wall of the plug, or are of a frustro-conical shape.

DESCRIPTION OF THE PREFERRED EMBODIMENT

Figure 1:
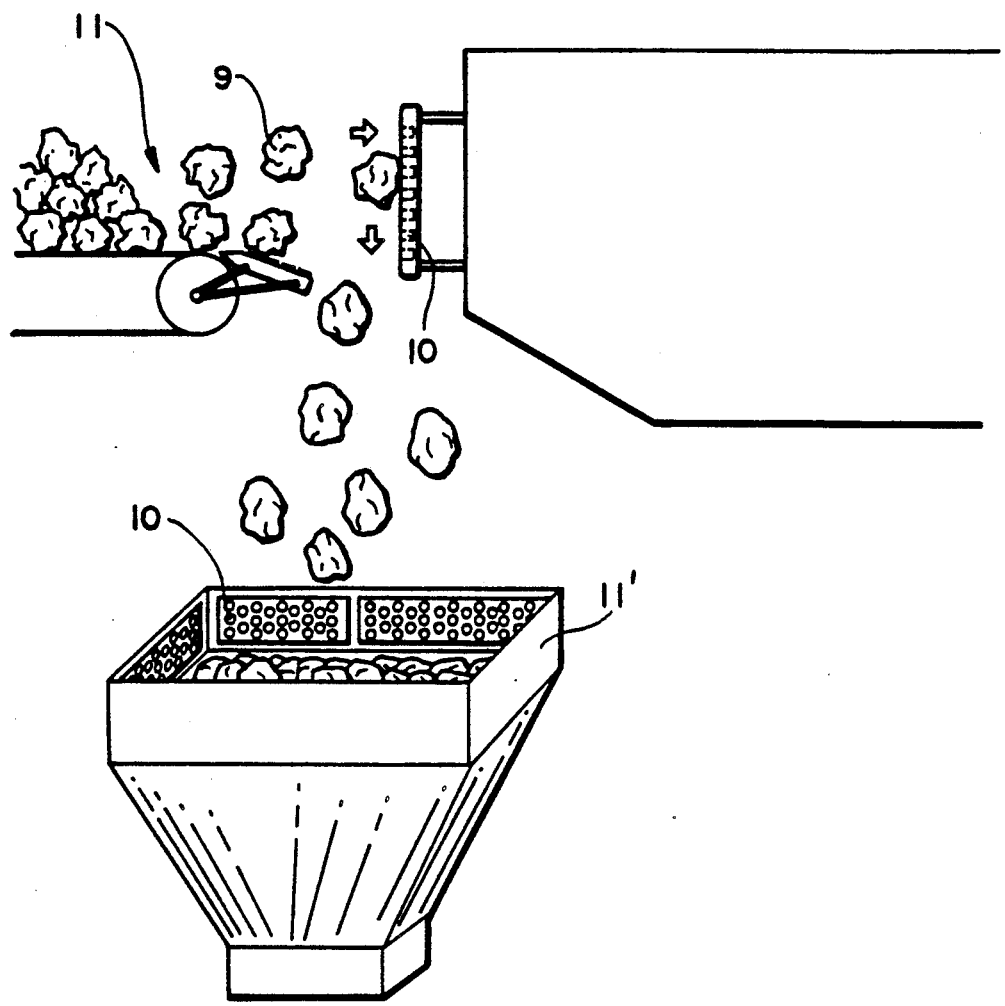
FIG. 1 is an environmental view of the wearliner according to the preferred embodiment of the present invention illustrating a typical application of the wearliner.

Looking now in greater detail at the accompanying drawings and particularly at FIG. 1, an aggregate particle shield according to the preferred embodiment of the present invention is illustrated and indicated generally at 10, and is shown in a typical working environment. Aggregate ore particles 9 travel along a conveyor assembly 11 to its terminus where they are gravitationally fed into a feeder hopper 11. Aggregate particle shields 10 of the present invention are utilized as both a backstop to deflect stray aggregate particles into the feeder hopper 11 and as a liner for the walls of the feeder hopper 11. The particle shields 10 help to contain airborne aggregate material and to protect the inner walls of the feeder hopper 11.

Figure 2:
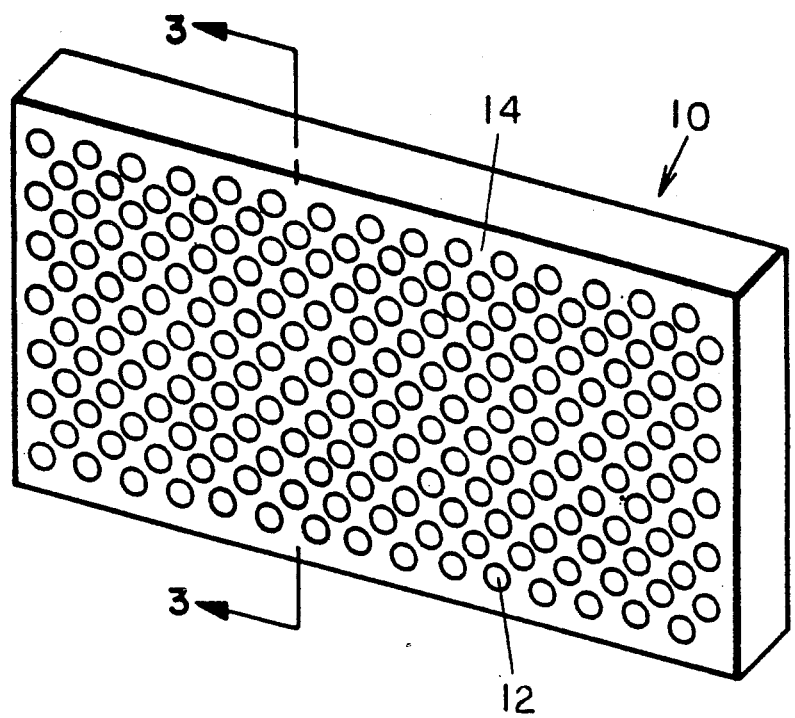
FIG. 2 is a perspective view of the wearliner of FIG. 1.
Figure 3:
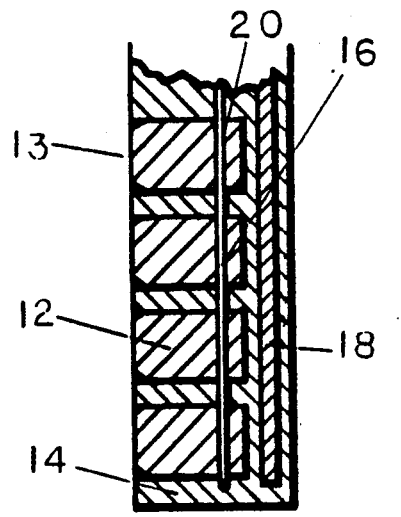
FIG. 3 is a section view of the wearliner of FIG. 2 taken along line 3—3 thereof.

Looking now at FIG. 2, the aggregate particle shield 10 basically includes an array of impact plugs 12 upstanding in a bed of molded polyurethane 14. As best seen in FIG. 3, the impact plugs are interconnected by a connecting wire 16 which passes through passageways 20 formed in the impact plugs 12. A steel backing plate 18 is molded into the polyurethane bed 14 and is located behind the impact plugs 12 to add strength and rigidity to the aggregate particle shield 10, and the impact plugs 12 are mounted so that their upper surfaces 13 are generally co-planar and flush with the outer flat surface of the polyurethane bed 14.

To form the aggregate particle shield 10, a generally rectangular mold (not shown) is constructed having a relatively shallow depth. A shallow backing layer of molten polyurethane 14 is poured into the mold and the backing plate 18 inserted therein. The impact plugs 12 are arranged in rows with each passageway 20 aligned with others in the row and with each plug in a row interconnected by the connecting wire 16, the rows being arranged in a predetermined pattern, as will be discussed in greater detail hereinafter, within the mold. Molten polyurethane 14 is poured to fill the mold to the level of the upper, co-planar surfaces of the impact plugs 12, filling the space between each plug 12 and seeping into the passageway 20 of each plug 12. Once the polyurethane cools and hardens, the impact plugs 12 and the backing plate 18 are held securely in place. The shield 10 is then removed from the mold.

Figure 4:
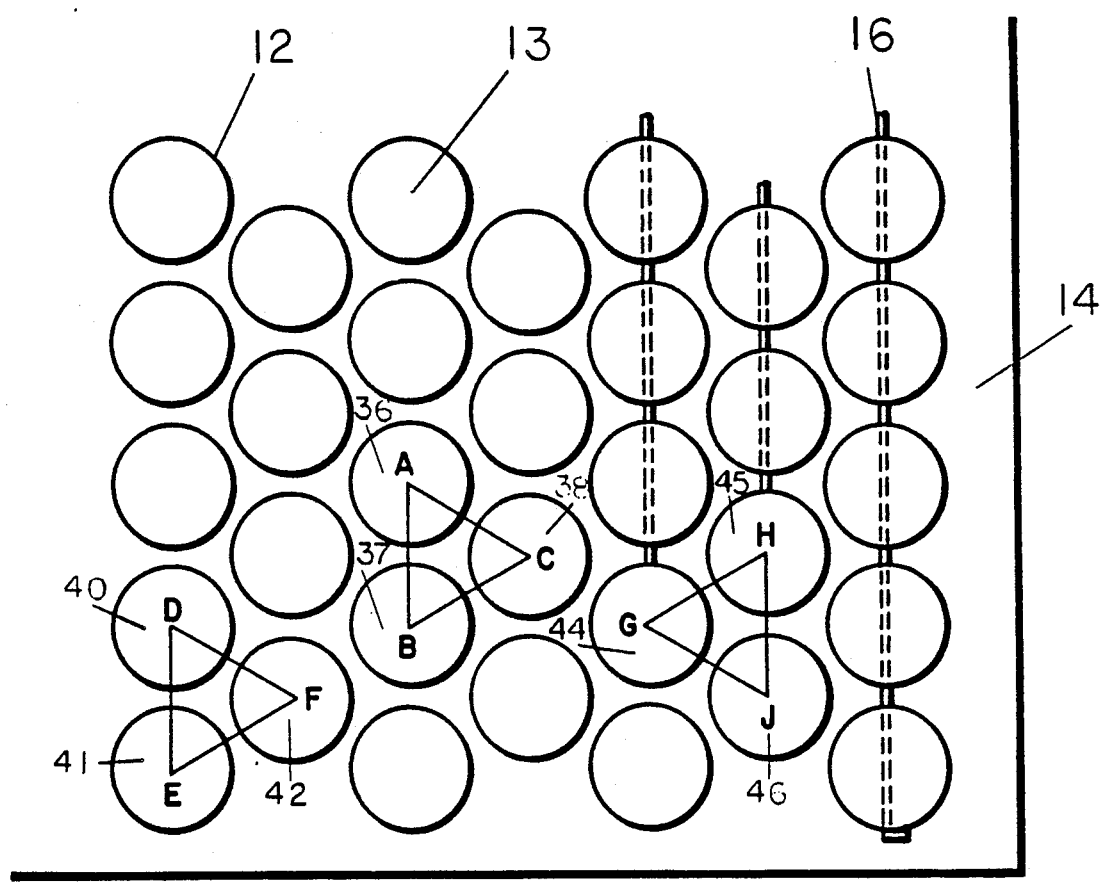
FIG. 4 is a perspective view of an impact plug included within the wearliner of FIG. 2.
Figure 5:
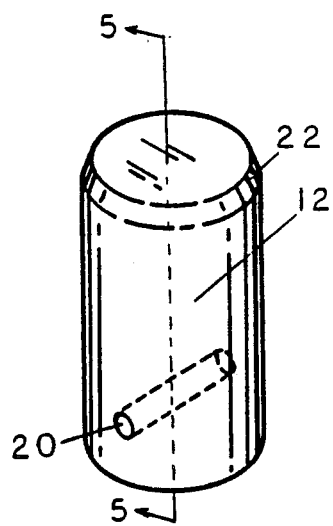
FIG. 5 is a vertical cross-sectional view of the impact plug of FIG. 5 taken along line 5—5 thereof.

Referring now to FIGS. 4 and 5, each impact plug 12 is generally in the shape of a cylinder, and is formed of a ceramic material which is 99.5% pure alumina and 0.5% silica. The passageway 20 is formed near the lower surface of the impact plug 12 and extends through the body of the impact plug 12 and accommodates connecting wire 16, which will be described in greater detail hereinafter. The impact plug 12 includes a rounded edge 22 where the upper surface 13 intersects the side wall of the impact plug 12.

Figure 6:
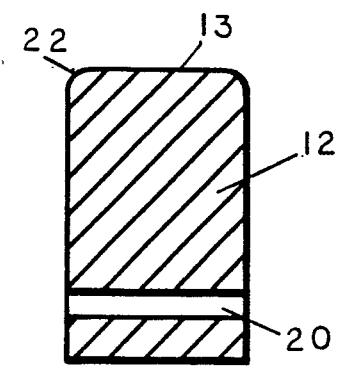
FIG. 6 is a plan view of a portion of the wearliner of FIG. 2.

With reference to FIG. 6, the impact plugs 12 are arranged within the polyurethane bed 14 in a predetermined pattern, with the impact plugs 12 being arranged in rows and each plug within a row being aligned and interconnected by the connecting wire 16. Each row is disposed in spaced parallel relation to an adjacent row such that imaginary lines connecting the centers of any two plugs in one row and the center of the plug in an adjacent row which is closest to such two plugs form an equilateral triangle. As illustrated in FIG. 4 by plugs 36, 37, and 38, line A-B equals line A-C which in turn equals line B-C forming an equilateral triangle, ABC. As can be seen by impact plugs 40, 41, and 42 forming triangle DEF and impact plugs 44, 45, and 46 forming triangle GHJ, the pattern repeats itself throughout the aggregate particle shield 10. This pattern arrangement eliminates the need for the smaller diameter impact plugs and maximizes the surface area presented by the impact plugs 12 across the impact surface of the shield 10 by locating the impact plugs 12 in this closest possible proximity while leaving space for the filler 14.

Figure 7A:
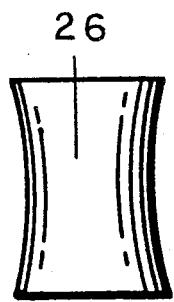
FIGS. 7A-7C are side elevational views of impact plugs illustrating alternative embodiments of the present invention.
Figure 7B:
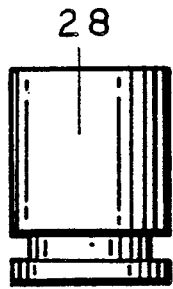
Figure 7C:
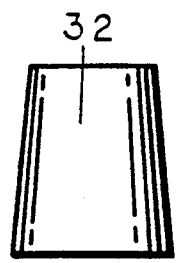

In order to further reduce the likelihood of impact plugs 12 becoming dislodged from the polyurethane bed 14 of the shield 10, the impact plugs may be formed in a plurality of distinct shapes that are generally cylindrical and have a reduced traverse cross-sectional area which creates an annular cavity in the side wall of the impact plug 12 for receiving the polyurethane. The polyurethane within the annular cavity provides an increased purchase on the impact plugs 12, thus holding the impact plugs 12 more securely in place within the polyurethane bed 14. Three alternative shapes are represented in FIGS. 7A through 7C. With reference to FIG. 7A, the impact plug shape 26 includes a side wall that is a concave surface of revolution 27 about the center axis 27' of the plug 26. As seen in FIG. 7B, impact plug shape 28 includes an annular channel 29 formed in the side wall of impact plug shape 28. A third distinct shape is shown in FIG. 7C which illustrates impact plug shape 30 being frustro-conical in shape. The cavities created by these various distinct shapes fill with polyurethane that acts to hold the impact plugs more securely in place. By locating a portion of the filler 14 within the field defined by the lines of action of any impact force applied to an impact plug 12, the plug is less likely to move in the direction of the impact force and as a result is less likely to become dislodged from the polyurethane bed 14.

It will be apparent that the unique construction of the aggregate particle shield 10 of the present invention provides a shield which, due to the pattern arrangement 24 of the impact plugs 12, maximizes the impact plug 12 surface area along the impact side of the shield 10. The impact plugs 12 are held securely in place by the connecting member 16 in conjunction with the passageways 20 of the impact plugs 12. In addition, by locating the passageway 20 well away from the impact surface 13 of the impact plug 12, the impact plug 12 is much more resistant to fracture than if the hole were larger and/or closer to the impact surface 13. Additionally, the impact plugs 12 of the present invention are more resistant to chipping due to the rounded edge 22 joining the plug body to the upper surface 13 of the impact plug 12. By removing the 90° edge which joins the impact surface of the plug 12 with the side wall of the plug 12, any impact force is distributed over a larger area, i.e., the rounded surface, than the sharp edge presented as the 90° corner. The likelihood of chipping is thereby diminished.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An aggregate particle shield for use as a wearliner or the like, in aggregate material transport devices, such as line vibrating feeders, discharge chutes, feeder hoppers or the like, said particle shield comprising a multiplicity of impact plugs formed of a material highly resistant to wear caused by aggregate particle impact, said plugs having a body including an upper surface, said multiplicity of plugs being arranged in a predetermined pattern and oriented so that all of said upper surfaces thereof are substantially co-planar; filler means formed of a hardened, molded material for occupying the interstices between said impact plugs and areas surrounding said impact plugs, thereby giving shape and resiliency to said shield while retaining said impact plugs in position and presenting said impact plugs for contact with the aggregate particles; and connecting means formed of a strong, resilient material for interconnecting at least some of said impact plugs in said predetermined pattern to maintain said impact plugs in said predetermined pattern and to assist in holding said impact plugs in position during and after repeated aggregate particle impact, thereby enhancing the strength and stability of the shield.

2. An aggregate particle shield according to claim 1 and characterized further in that said impact plugs are formed of a ceramic material, said filler means is formed of a polyurethane material, and said connecting means is a metal wire.

3. An aggregate particle shield according to claim 2 and characterized further in that said ceramic material includes 99.5% pure alumina and 0.5% silica, and said shield includes a backing plate made of steel and located behind said predetermined pattern of impact plugs, said backing plate providing structural strength and rigidity to said shield.

4. An aggregate particle shield according to claim 1 and characterized further in that said plug body has a passageway formed therethrough and said connecting means is inserted through said passageway in a plurality of said impact plugs, thereby interconnecting and aligning said plurality of said impact plugs within said predetermined pattern.

5. An aggregate particle shield according to claim 4 and characterized further in that said impact plugs include a lower surface spaced away from said upper surface, and said passageway is located closely adjacent said lower surface, thereby locating said passageway away from said impact area and reducing the likelihood of impact plug fracture resulting from the effect of repeated aggregate particle impact.

6. An aggregate particle shield according to claim and characterized further in that said impact plugs are generally cylindrical and said predetermined pattern arrangement includes a plurality of rows, each having said impact plugs disposed in a side-by-side relationship, with said passageways in said impact plugs aligned and having said connecting means passing therethrough so that each plug in each said row is connected to every other plug in that row such that a plurality of impact plugs is aligned into a row and interconnected by said interconnecting means.

7. An aggregate particle shield according to claim 6 and characterized further in that said predetermined pattern arrangement includes each row being disposed in spaced parallel relation to an adjacent row such that imaginary lines connecting the centers of any two plugs in a row and the center of the plug in an adjacent row which is closest to said two plugs form an equilateral triangle, thereby equalizing the space between all said plugs within said shield and maximizing the impact plug surface area presented by said shield.

8. An aggregate particle shield according to claim 1 and characterized further in that said impact plugs include at least one side wall and are formed in a generally cylindrical shape, said impact plugs having a rounded exterior surface at the location where said side wall intersects said upper surface, said rounded surface aiding wear resistance by reducing chipping at the edges of said impact plugs caused by impact with said aggregate particles.

9. An aggregate particle shield for use as a wearliner or the like, in aggregate material transport devices such as line vibrating feeders, discharge chutes, feeder hoppers or the like, said particle shield comprising:
a) a multiplicity of generally cylindrical impact plugs formed of a ceramic material highly resistent to wear, said plugs having a body including an upper surface, a lower surface, and wall means for joining said upper surface and said lower surface; said impact plugs having a rounded exterior surface where said wall means intersects said upper surface, said rounded surface aiding wear resistance by reducing chipping at the edges of said impact plug caused by impact with said aggregate particles, and a passageway formed through said plug body located closely adjacent said lower surface and spaced away from said upper surface; said multiplicity of plugs being arranged in a predetermined pattern wherein said upper surfaces of said plugs are substantially co-planar, said predetermined pattern including a plurality of rows, each said row including a plurality of said impact plugs disposed in a side-by-side relationship, each said row being disposed in spaced parallel relation to an adjacent row such that imaginary lines connecting the centers of any two plugs in a row and the center of the plug in an adjacent row closest to said two plugs form an equilateral triangle, thereby equalizing the space between all said plugs within said shield and maximizing the impact surface area presented by said shield;
b) filler means formed of hardened, molded polyurethane for occupying the interstices between said impact plugs and the areas surrounding said impact plugs thereby giving shape and resiliency to said shield while retaining said impact plugs in position and presenting said impact plugs for contact with the aggregate particles;
c) connecting means formed of a strong resilient wire material for interconnecting at least some of said impact plugs in said rows of said predetermined pattern, said connecting means being inserted through said passageway of each said impact plug in each said row in said predetermined pattern, to maintain said impact plugs in said predetermined pattern and to assist in holding said impact plugs in position during and after repeated aggregate particle impact thereby enhancing the strength and stability of said shield; and
d) a backing plate made of steel and located behind said predetermined pattern of said impact plugs, said backing plate providing structural strength and rigidity to said aggregate particle shield.

10. An aggregate particle shield for use as a wearliner or the like, in aggregate material transport devices, such as line vibrating feeders, discharge chutes, feeder hoppers or the like, said particle shield comprising a multiplicity of impact plugs upstanding in a hardened, molded polyurethane bed, said plugs having a body including an upper surface, a lower surface and wall means for joining said upper surface and said lower surface, said impact plugs being formed of a distinct shape that is generally cylindrical and has a reduced traverse cross-sectional area creating an annular cavity in said wall means of said impact plugs for receiving said polyurethane, said cavity providing an increased purchase in said impact plugs by said filler means whereby said impact plugs are held securely in place, said impact plugs being arranged in a predetermined pattern, and oriented so that all of said upper surfaces of said impact plugs are substantially co-planar with each said upper surface of each said impact plug being presented for contact with the aggregate particles.

11. An aggregate particle shield according to claim 10 and characterized further in that said impact plugs are formed of a ceramic material and said filler means is formed of a polyurethane material.

12. An aggregate particle shield according to claim 11 and characterized further in that said ceramic material includes 99.5% pure alumina and 0.5% silica, and said shield includes a backing plate made of steel and located behind said predetermined pattern of impact plugs, said backing plate providing structural strength and rigidity to said shield.

13. An aggregate particle shield according to claim 10 and characterized further in that said impact plugs are generally cylindrical and said predetermined pattern arrangement includes a plurality of rows, each having said impact plugs disposed in a side-by-side relationship.

14. An aggregate particle shield according to claim 13 and characterized further in that said predetermined pattern arrangement includes each row being disposed in spaced parallel relation to an adjacent row such that imaginary lines connecting the centers of any two plugs in a row and the center of the plug in an adjacent row which is closest to said two plugs form an equilateral triangle, thereby equalizing the space between all said plugs within said shield and maximizing the impact plug surface area presented by said shield.

15. An aggregate particle shield according to claim 10 and characterized further in that said impact plugs include at least one side wall and are formed in a generally cylindrical shape, said impact plugs having a rounded exterior surface at the location where said side wall intersects said upper surface, said rounded surface aiding wear resistance by reducing chipping at the edges of said impact plugs caused by impact with said aggregate particles.

16. An aggregate particle shield according to claim 10 and characterized further in that said impact plugs include at least one side wall and are formed in one of a plurality of distinct shapes being generally cylindrical and having a reduced traverse cross-sectional area creating an annular cavity in said side wall of said impact plug for receiving said filler means which provides an increased purchase on said impact plugs by said filler means whereby said impact plugs are held securely in place.

17. An aggregate particle shield according to claim 16 and characterized further in that one of said plurality of distinct shapes of said impact plugs includes a side wall that is a concave surface of revolution about the center axis of said impact plug.

18. An aggregate particle shield according to claim 16 and characterized further in that one of said plurality of distinct shapes of said impact plugs includes an annular channel formed in said side wall.

19. An aggregate particle shield according to claim 16 and characterized further in that one of said plurality of distinct shapes of said impact plugs is formed with a frustro-conical shape.

* * * * *